G. ESCHELLMANN & A. HARMUTH.
PROCESS OF EFFECTING EXOTHERMIC GAS REACTIONS.
APPLICATION FILED SEPT. 18, 1906.

1,036,473.

Patented Aug. 20, 1912.

Witnesses:

Inventors:
Georg Eschellmann,
Albert Harmuth,
by Byrnes & Townsend
Att'ys.

UNITED STATES PATENT OFFICE.

GEORG ESCHELLMANN AND ALBERT HARMUTH, OF ST. PETERSBURG, RUSSIA, ASSIGNORS TO GENERAL CHEMICAL COMPANY, OF NEW YORK, N. Y., A CORPORATION OF NEW YORK.

PROCESS OF EFFECTING EXOTHERMIC GAS REACTIONS.

1,036,473.     Specification of Letters Patent.     Patented Aug. 20, 1912.

Application filed September 18, 1908. Serial No. 335,129.

*To all whom it may concern:*

Be it known, that we, GEORG ESCHELLMANN, a subject of the King of Great Britain, and ALBERT HARMUTH, a subject of the Emperor of Germany, both residing at St. Petersburg, Russian Empire, have invented certain new and useful Improvements in Processes of Effecting Exothermic Gas Reactions, of which the following is a specification.

In effecting certain exothermic gas reactions by the use of a heated catalytic agent, and especially in producing sulfur trioxid from a mixture of surfur dioxid and air, it is important that the catalytic agent be maintained between certain known temperature limits. Various methods of recovering the surplus reaction-heat from the catalytic agent have been proposed and adopted, generally dependent on the transfer of the heat to the incoming gas-mixture, either through the walls of the reaction chamber, or after having left the reaction chamber, but in both cases indirectly.

According to the present process, the reacting gases are passed to and through one body of the catalytic agent, arranged in a broad thin layer transverse to the path of the gases, so that the reaction-heat may easily radiate directly into the advancing gas-stream, thus avoiding any undesirable overheating of the contact agent, and the products of reaction are then passed through a second body or bodies of the catalytic agent, preferably arranged longitudinally in the path of the gases, wherein the reaction-heat is retained and utilized to cause the reaction to proceed substantially to a finish.

The process may be carried out by apparatus of various forms. Constructions which have been found effective are shown in the accompanying drawing, in which—

Figure 1:
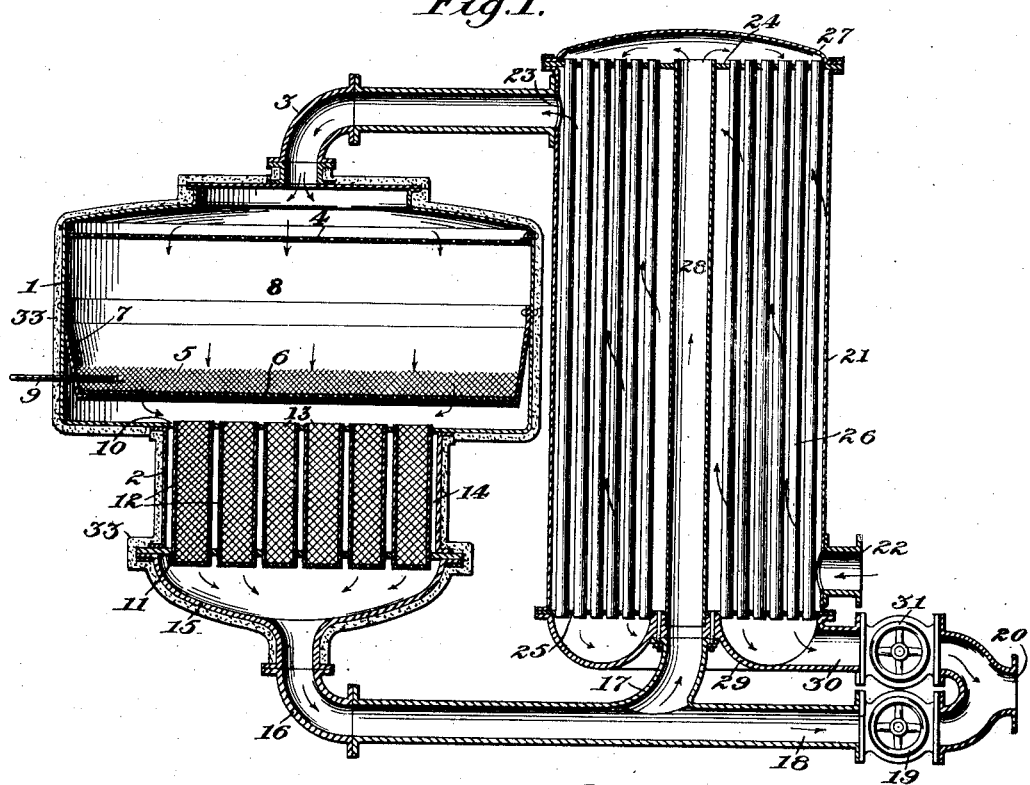
Figure 2:
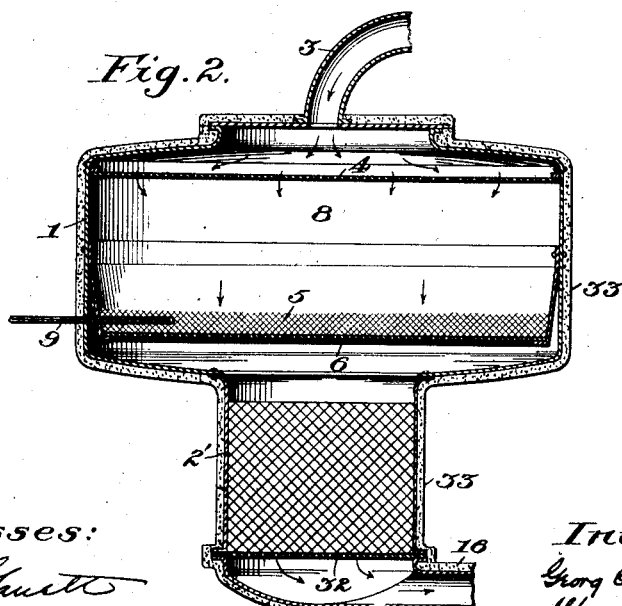

Figure 1 is a vertical central section of a reaction vessel and gas preheater; and Fig. 2 is an axial section of a modified reaction vessel.

The apparatus shown in Fig. 1 comprises superposed reaction chambers 1, 2. The upper chamber has an inlet 3 beneath which is a horizontal perforated plate 4, to distribute the incoming gases into a wide stream, filling the chamber. The catalytic material 5, for example platinized abestos, is arranged in a broad, relatively thin layer on a perforated cast-iron plate 6, supported by the flanged lower edge of a ring 7 secured at its upper edge to the wall of the chamber. Between the gas distributer 4 and the catalytic material 5 is a large empty space 8, into which, in operation, the heat developed within the layer of catalytic material is freely radiated. The bulb of a thermometer 9 is arranged within the chamber 1, in the catalytic material 5, and its stem projects externally. The lower chamber 2 is closed at its upper and lower ends by horizontal tube-sheets 10, 11, within which are secured the ends of a number of vertical tubes 12 filled with catalytic material 13. The space 14 around and between the tubes and inclosed by the outer wall of the chamber 2 is filled with air of gas, serving as a heat insulation. The upper ends of the tubes 12 are in open communication with the upper chamber 1 and the lower ends of these tubes open into a receiver 15 having an outlet-pipe 16. This pipe has two branches, the first, 17, leading to the preheater and the second, 18, being controlled by a valve 19 and opening into an outlet 20 which communicates with suitable apparatus for absorbing the sulfur trioxid. The preheater comprises a vertical cylindrical wall 21 having an inlet 22 and outlet 23 for the mixture of sulfur dioxid and air. Secured to the upper and lower end of the wall 21 are tube-sheets 24, 25 in which are secured the ends of the narrow vertical tubes 26. The upper ends of these tubes are inclosed by a cover 27, forming a chamber into which the products of reaction from the contact-chambers may be introduced by a central pipe 28 connected with the branch-pipe 17. The lower ends of the pipes 26 are inclosed by a cover 29 opening through a passage 30 having a valve 31, into the outlet 20. The hot products of reaction, supplied from the contact chambers through the central pipe 28 and thence distributed through the small pipes 26, preheat the incoming gases passing around these tubes to the desired temperature.

The reaction-vessel illustrated in Fig. 2 differs from that of Fig. 1 in that the catalytic material in the lower chamber 2' is arranged in a single body, of considerable width, filling the chamber and supported by perforated plates 32.

The walls of the upper and lower reaction chambers, in both constructions, are jacketed with a heat-insulating material 33.

In employing the described apparatus for the production of sulfur trioxid, the preheater and reaction chambers are brought to the working temperature by passing a stream of hot air or products of combustion through them until the thermometer 9 and the upper chamber 1 indicates a temperature of about 450° C. The proper mixture of sulfur dioxid and air is then supplied, entering the preheater through the opening 22, leaving it through the opening 23 and entering the upper reaction-chamber at its top. The gases are distributed into a wide stream by the perforated plate 4, flow downward through the space 8 and enter the hot layer 5 of catalytic material, wherein from 90 to 95 per cent. of the surfur dioxid is oxidized to sulfur trioxid. The heat evolved by this reaction radiates upward from the surface of the broad thin layer of catalytic material into the stream of gases in the space 8, advancing in lines substantially normal to the surface of the layer, the desired transfer of heat being thus directly, continuously and uniformly effected. The products of reaction pass from the chamber 1 into and through the contact material in the lower reaction chamber 2 or 2', wherein the greater part of the remaining sulfur dioxid is oxidized, the percentage of sulfur dioxid converted into sulfur trioxid and discharged through the outlet 16 being from 97 to 99. The reaction-heat is retained in the lower chamber, in the apparatus of Fig. 1 both by the dead air space around the tubes 12 and by the external jacket 20, thus maintaining the temperature necessary for carrying the reaction substantially to a finish. The valves 19, 31 are now set to shunt a portion of the products through the preheater, the percent thus diverted being dependent on the amount of sulfur dioxid in the incoming gases, the speed of these gases and the nature, amount and thickness of the layer of contact material in the upper chamber. The valves 19, 31 may be adjusted as required to suit varying conditions and maintain a temperature of 450° C. at the zone of maximum temperature, as indicated by the thermometer, although in practice little regulation is found necessary.

The arrangement of the greater amount of the catalytic agent in a broad, thin layer enables the heat generated by the initial contact of the gases, constituting a large percentage of the total reaction-heat, to be quickly transferred by radiation to the incoming gases, whereby the objectionable overheating of the contact material is prevented and the heat is effectively utilized to preheat the incoming gases. The thin layer presents little frictional resistance to the flow of gases therethrough, enabling blowing engines of half the usual power to be employed. A given output of sulfur trioxid may be produced in apparatus of relatively small size and low cost. The regulation is simple, the apparatus having but one inlet and outlet and one thermometer. The catalytic material is easily introduced and is quickly preheated. The support for this material may be of cast-iron, which is cheap, inert and durable.

It will be observed that the cross section of the apparatus is greater at the catalytic layer through which the gases pass first, than at the second catalytic layer. In consequence of this the gases will travel at different velocities through the two bodies of the catalytic agent, the speed being relatively low at the point where it is desired to expose the gases to the preheating effect due to the backward radiation of heat from the first catalytic layer, and being relatively high at a point beyond said layer, so as to quickly carry away the mixture heated by partial conversion and thus allow the first catalytic layer to become cooled more efficiently.

We claim:—

1. The process of effecting exothermic gas reactions, which consists in passing a stream containing reacting gases in contact with a body of catalytic agent, and then, without dilution and at higher velocity, in contact with another body of catalytic agent.

2. The process of producing sulfur trioxid, which consists in passing a gaseous stream containing sulfur dioxid and oxygen in contact with a body of catalytic agent, and then, without dilution and at higher velocity, in contact with another body of catalytic agent.

3. The process of effecting exothermic gas reactions, which consists in passing a stream containing reacting gases in contact with a body of catalytic agent, and then, without cooling, dilution, or removal of the reaction-products, in contact with another body of catalytic agent.

4. The process of producing sulfur trioxid, which consists in passing a gaseous stream containing sulfur dioxid and oxygen in contact with a body of catalytic agent, and then, without cooling, dilution, or removal of the reaction-products, in contact with another body of catalytic agent.

5. The process of effecting exothermic gas reactions, which consists in passing a stream containing reacting gases through a wide thin layer of catalytic agent, and then through a narrower thicker body of catalytic agent.

6. The process of producing sulfur trioxid, which consists in passing a gaseous stream containing sulfur dioxid and oxygen through a wide thin layer of catalytic agent, and then through a narrower thicker body of catalytic agent.

7. The process of effecting exothermic gas reactions, which consists in passing a stream containing reacting gases through a wide thin layer of catalytic agent, and then reducing the width of said stream and passing it through a thicker body of catalytic agent.

8. The process of producing sulfur trioxid, which consists in passing a gaseous stream containing sulfur dioxid and oxygen through a wide thin layer of catalytic agent, and then reducing the width of said stream and passing it through a thicker body of catalytic agent.

9. The process of effecting exothermic gas reactions, which consists in passing a stream containing reacting gases through a wide thin layer of catalytic agent, then reducing the width of said gas-stream, without intermediate cooling or removal of the reaction-products, and passing it through a thicker body of catalytic agent.

10. The process of producing sulfur trioxid, which consists in passing a gaseous stream containing sulfur dioxid and oxygen through a wide thin layer of catalytic agent, then reducing the width of said gas stream, without intermediate cooling or removal of the reaction-products, and passing it through a thicker body of catalytic agent.

11. The process of effecting exothermic gas reactions which consists in passing a stream containing reacting gases through a wide thin layer of catalytic agent, and then, without cooling, through a narrower thicker body of catalytic agent.

12. The process of producing sulfur trioxid, which consists in passing a stream containing sulfur dioxid and oxygen through a wide thin layer of catalytic agent, and then, without cooling, through a narrower thicker body of catalytic agent.

13. The process of effecting exothermic gas reactions, which consists in preheating one or more of the reacting gases, passing a stream containing the reacting gases in contact with a wide thin layer of catalytic agent and thereby further heating the incoming gases by reaction-heat radiated from said layer directly into said stream, and, without cooling, and at higher velocity, substantially completing the reaction by passing the initial reaction-products in contact with another body of catalytic agent.

14. The process of producing sulfur trioxid, which consists in preheating a stream of gases containing sulfur dioxid and oxygen, passing the gaseous stream in contact with a wide thin layer of catalytic agent and thereby further heating the incoming gases by reaction-heat radiated from said layer directly into said stream, and, without cooling, and at higher velocity, substantially completing the reaction by passing the initial reaction-products in contact with another body of catalytic agent.

15. The process of effecting exothermic gas reactions, which consists in preheating one or more of the reacting gases, passing a stream containing the reacting gases in contact with a wide thin layer of catalytic agent and thereby further heating the incoming gases by reaction-heat radiated from said layer directly into said stream, and substantially completing the reaction by passing the initial reaction-products, without dilution and at higher velocity, in contact with another body of catalytic agent.

16. The process of producing sulfur trioxid, which consists in preheating a stream of gases containing sulfur dioxid and oxygen, passing the gaseous stream in contact with a wide thin layer of catalytic agent and thereby further heating the incoming gases by reaction-heat radiated from said layer directly into said stream and substantially completing the reaction by passing the initial reaction-products, without dilution and at higher velocity, in contact with another body of catalytic agent.

In testimony whereof, we affix our signatures in presence of two witnesses.

GEORG ESCHELLMANN.
ALBERT HARMUTH.

Witnesses:
AL. A. LOVIAGUINE,
AUG MIGHIS.